United States Patent
Reinking et al.

(10) Patent No.: US 6,939,930 B2
(45) Date of Patent: Sep. 6, 2005

(54) HYDROSILANE ADDITIVES FOR INCREASED POLYOLEFIN MOLECULAR WEIGHT

(75) Inventors: Mark K. Reinking, Mason, OH (US); Gregory G. Hlatky, Morrow, OH (US)

(73) Assignee: Equistar Chemicals, LP, Houston, TX (US)

( * ) Notice: Subject to any disclaimer, the term of this patent is extended or adjusted under 35 U.S.C. 154(b) by 126 days.

(21) Appl. No.: 10/657,845

(22) Filed: Sep. 9, 2003

(65) Prior Publication Data

US 2005/0054793 A1 Mar. 10, 2005

(51) Int. Cl.⁷ .............................. C08F 4/64; C08F 4/642
(52) U.S. Cl. ...................... 526/161; 526/161; 526/165; 526/128; 526/126; 526/943; 502/158; 502/155
(58) Field of Search .................. 526/160, 161, 526/165, 128, 126, 943; 502/155, 158

(56) References Cited

U.S. PATENT DOCUMENTS

| | | | |
|---|---|---|---|
| 5,064,802 A | 11/1991 | Stevens et al. | 502/155 |
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,495,035 A | 2/1996 | Jordan et al. | 556/1 |
| 5,539,124 A | 7/1996 | Etherton et al. | 548/402 |
| 5,578,690 A | 11/1996 | Marks et al. | 526/347 |
| 5,637,659 A | 6/1997 | Krishnamurti et al. | 526/133 |
| 5,648,440 A | 7/1997 | Sugano et al. | 526/132 |
| 5,902,866 A | 5/1999 | Nagy et al. | 526/133 |
| 6,075,103 A | 6/2000 | Marks et al. | 526/127 |
| 6,077,919 A | 6/2000 | Marks et al. | 526/82 |
| 6,211,311 B1 | 4/2001 | Wang et al. | 526/131 |
| 6,232,260 B1 | 5/2001 | Nagy et al. | 502/155 |
| 6,440,889 B1 | 8/2002 | Tsuie | 502/152 |
| 6,451,724 B1 | 9/2002 | Nifant'ev et al. | 502/103 |
| 6,559,251 B1 | 5/2003 | Wang et al. | 526/127 |
| 6,642,326 B1 | 11/2003 | Meyer et al. | 526/134 |
| 6,693,155 B1 * | 2/2004 | Meverden et al. | 526/160 |
| 6,794,468 B1 * | 9/2004 | Wang | 526/161 |
| 6,818,713 B1 * | 11/2004 | Wang et al. | 526/161 |
| 6,838,410 B2 * | 1/2005 | Wang et al. | 502/103 |

FOREIGN PATENT DOCUMENTS

| | | |
|---|---|---|
| EP | 0739910 | 10/1996 |
| WO | WO 01/53360 | 7/2001 |

OTHER PUBLICATIONS

Koo, et al., *J. Am. Chem. Soc. 121* (1991), pp. 8791.
Buu–Hoi and Xuong, *J. Chem. Soc.* (1952) 2225.
Diamond, et al., *J. Am. Chem. Soc. 118* (1996) 8024.
Diamond, et al., *Organometallics 15* (1996) 4045.

* cited by examiner

*Primary Examiner*—Caixia Lu
(74) *Attorney, Agent, or Firm*—John Tyrell; Jonathan L. Schuchardt

(57) ABSTRACT

A process for polymerizing olefins is disclosed. The process uses a hydrosilane in a polymerization catalyzed by an open architecture, bridged indenoindolyl organometallic complex and an activator. Polyolefins from the process have increased molecular weight.

15 Claims, No Drawings

HYDROSILANE ADDITIVES FOR INCREASED POLYOLEFIN MOLECULAR WEIGHT

FIELD OF THE INVENTION

The invention relates to a process for making polyolefins. The process, which uses hydrosilanes with catalysts having a bridged indenoindolyl ligand with "open architecture," is valuable for making polyolefins with high molecular weight.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Single-site olefin polymerization catalysts having "open architecture" are generally known. Examples include the so-called "constrained geometry" catalysts developed by scientists at Dow Chemical Company (see, e.g., U.S. Pat. No. 5,064,802), which have been used to produce a variety of polyolefins. "Open architecture" catalysts differ structurally from ordinary bridged metallocenes, which have a bridged pair of pi-electron donors. In open architecture catalysts, only one group of the bridged ligand donates pi electrons to the metal; the other group is sigma bonded to the metal. An advantage of this type of bridging is thought to be a more open or exposed locus for olefin complexation and chain propagation when the complex becomes catalytically active. Simple examples of complexes with open architecture are tert-butylamido(cyclopentadienyl)dimethylsilylzirconium dichloride and methylamido(cyclopentadienyl)-1,2-ethanediyltitanium dimethyl:

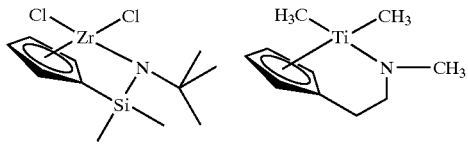

Organometallic complexes that incorporate "indenoindolyl" ligands are known (see U.S. Pat. Nos. 6,232,260 and 6,451,724). The '260 patent demonstrates the use of non-bridged bis(indenoindolyl) complexes for making HDPE in a slurry polymerization. Versatility is an advantage of the complexes; by modifying the starting materials, a wide variety of indenoindolyl complexes can be prepared. "Open architecture" complexes are neither prepared nor specifically discussed. The '724 patent ("Nifant'ev") teaches the use of bridged indenoindolyl complexes as catalysts for making polyolefins, including polypropylene, HDPE and LLDPE. The complexes disclosed by Nifant'ev do not have open architecture.

PCT Int. Appl. WO 01/53360 (Resconi et al.) discloses bridged indenoindolyl complexes having open architecture and their use to produce substantially amorphous propylene-based polymers. U.S. Pat. No. 6,559,251 discloses a process to make low density ethylene copolymers with catalysts having a bridged indenoindolyl ligand with open architecture. Copending application Ser. No. 10/382,233 discloses that indeno[1,2-b]indolyl catalysts provide exceptional activities in the preparation of elastomeric polypropylene and ethylene copolymers.

While the use of indenoindolyl complexes with open architecture is known, the use of additives to improve molecular weight is not. In particular, the use of hydrosilanes has not been contemplated.

The incorporation of silanes in polymerizations using cyclopentadienyl metallocene catalysts is described in EP 0739910, J. Am. Chem. Soc. 121 (1999) 8791 and in U.S. Pat. Nos. 5,578,690, 6,075,103 and 6,077,919. High levels of silane are used to lower the molecular weight. For instance, in the seventeen examples of EP 0739910, the silane is used in amounts of 26,800 to 465,000 ppm Si. At these levels, polymer molecular weight decreases with increasing silane and there is no clear effect on activity.

U.S. Pat. No. 6.642.326 uses low levels of hydrosilanes with boraaryl single-site catalyst precursors. It teaches an improvement in activity at low levels and that at higher hydrosilane levels, the polyolefin molecular weight can be undesirably low. In their polymerization examples with low levels of hydrosilanes, there is no indication of increased molecular weight. Where molecular weight is reported, it is lower than the control in three of the four instances.

While there has been no study of the use of hydrosilanes with indenoindolyl catalysts, analogy with other single-site catalyst systems would indicate that any effect would be to lower polyolefin molecular weight.

As noted earlier, the indenoindolyl framework is versatile. The need continues, however, for new ways to make polyolefins with increased molecular weight. Molecular weight affects several properties such as impact and toughness. For certain applications, high molecular weight polyolefins are required. The industry would also benefit from the availability of new processes that capitalize on the inherent flexibility of the indenoindolyl framework.

SUMMARY OF THE INVENTION

The invention is a process for making polyolefins. The process comprises polymerizing an olefin in the presence of a hydrosilane and a catalyst system comprising an activator and an organometallic complex. The complex, which has "open architecture," includes a Group 4 to 6 transition metal and a bridged indenoindolyl ligand. We surprisingly found that the hydrosilane enables the production of polyolefins having increased molecular weight while maintaining high catalyst activity.

DETAILED DESCRIPTION OF THE INVENTION

In the process of the invention, an olefin is polymerized with a catalyst system to produce a polyolefin with high molecular weight.

Catalyst systems useful for the process comprise an activator and an indenoindolyl Group 4–6 transition metal complex having open architecture. More preferred complexes include a Group 4 transition metal such as titanium or zirconium.

"Indenoindolyl" ligands are generated by deprotonating an indenoindole compound using a potent base. By "indenoindole compound," we mean an organic compound that has both indole and indene rings. The five-membered rings from each are fused, i.e., they share two carbon atoms.

Preferably, the rings are fused such that the indole nitrogen and the only sp$^3$-hybridized carbon on the indenyl ring are "trans" to each other. Such is the case in an indeno[1,2-b] indole ring system such as:

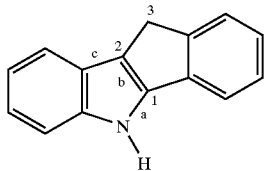

Suitable ring systems also include those in which the indole nitrogen and the sp$^3$-hybridized carbon of the indene are beta to each other, i.e., they are on the same side of the molecule. This is an indeno[2,1-b]indole ring system:

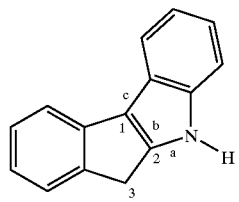

The ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present.

Numbering of indenoindoles follows IUPAC Rule A-22. The molecule is oriented as shown below, and numbering is done clockwise beginning with the ring at the uppermost right of the structure in a manner effective to give the lowest possible number to the heteroatom. Thus, 5,10-dihydroindeno[1,2-b]indole is numbered as follows:

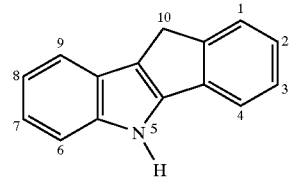

while 5,6-dihydroindeno[2,1-b]indole has the numbering:

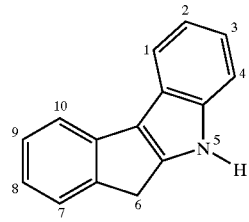

For correct nomenclature and numbering of these ring systems, see the *Ring Systems Handbook* (1998), a publication of Chemical Abstracts Service, Ring Systems File II: RF 33986-RF 66391 at RF 58952 and 58955. (Other examples of correct numbering appear in U.S. Pat. Nos. 6,451,724 and 6,559,251.)

Methods for making indeindndole compounds are well known. Suitable methods and compounds are disclosed, for example, in U.S. Pat. Nos. 6,232,260, 6,451,724, and 6,559,251, the teachings of which are incorporated herein by reference, and references cited therein, including the method of Buu-Hoi and Xuong, J. Chem. Soc. (1952) 2225. Suitable procedures also appear in PCT Int. Appl. WO 01/53360.

Indenoindolyl complexes useful for the process of the invention have open architecture. By "open architecture," we mean a complex having a fixed geometry that enables generation of a highly exposed active site when the catalyst is combined with an activator. The metal of the complex is pi-bonded to the indenyl Cp ring and is also sigma-bonded through two or more atoms to the indolyl nitrogen or the indenyl methylene carbon. (In contrast, many of the bridged indenoindolyl complexes described in the literature have a transition metal that is pi-bonded to the indenyl Cp ring and pi-bonded to another Cp-like group. See, e.g., U.S. Pat. Nos. 6,232,260 and 6,451,724). The metal is preferably sigma-bonded to a $C_1$–$C_{20}$ substituted nitrogen atom. The nitrogen atom is also linked to the indenoindolyl group through a bridging group, which is preferably dialkylsilyl, diarylsilyl, methylene, ethylene, isopropylidene, diphenylmethylene, or the like. Particularly preferred bridging groups are dimethylsilyl, methylene, ethylene, and isopropylidene. The bridging group is covalently bonded to the indolyl nitrogen or the indenyl methylene carbon.

In addition to the bridged indenoindolyl ligand, the organometallic complex usually includes one or more labile anionic ligands such as halides, alkoxys, aryloxys, alkyls, alkaryls, aryls, dialkylaminos, or the like. Particularly preferred are halides, alkyls, and alkaryls (e.g., chloride, methyl, benzyl).

In a preferred process of the invention, the indenoindolyl complex has the general structure:

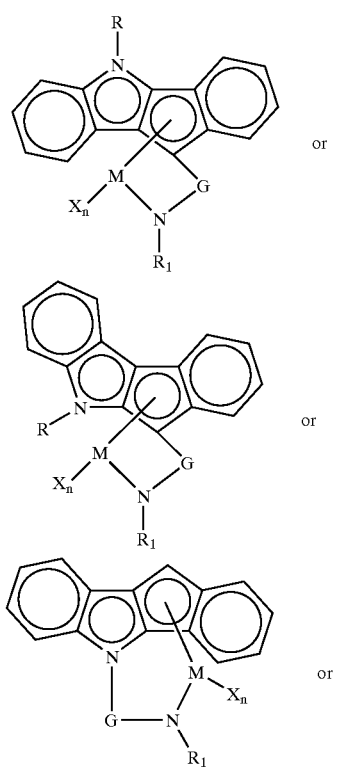

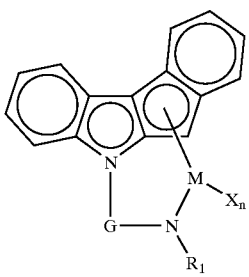

in which M is a Group 4–6 transition metal, G is a linking group, R is alkyl, aryl, dialkylboryl or trialkylsilyl, $R_1$ is $C_1$-$C_{20}$ hydrocarbyl, X is alkyl, aryl, alkoxy, aryloxy, halide, dialkylamino, or siloxy, and n satisfies the valence of M. More preferably, M is a Group 4 transition metal, G is dialkylsilyl, and X is halide or alkyl. $R_1$ is preferably C6-$C_{10}$ hydrocarbyl, more preferably $C_8$ hydrocarbyl. The aromatic rings can contain one or more substituents. Suitable substituents include alkyl, aryl, halide, haloalkyl, trialkylsilyl and the like.

Exemplary organometallic complexes useful for the process of the invention:

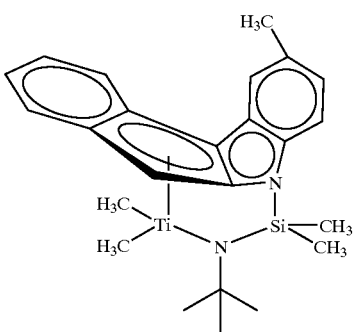

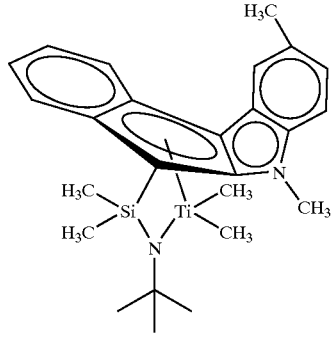

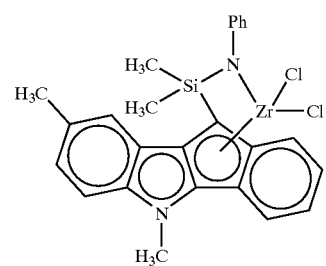

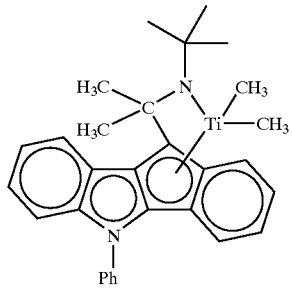

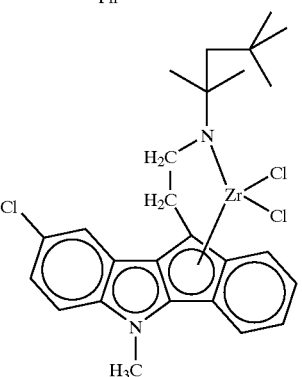

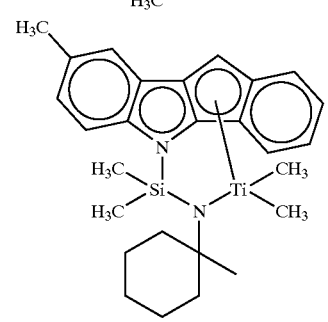

The complexes can be made by any suitable method; those skilled in the art will recognize a variety of acceptable synthetic strategies. See especially U.S. Pat. No. 6,559,251 and PCT Int. Appl. WO 01/53360 for suitable routes. Often, the synthesis begins with preparation of the desired indenoindole compound from particular indanone and arylhydrazine precursors. In one convenient approach, the indenoindole is deprotonated and reacted with dichlorodimethylsilane to attach a chlorodimethylsilyl group to the indenyl methylene carbon. Subsequent reaction with an amine or, more preferably, an alkali metal amide compound such as lithium t-butylamide (from t-butylamine and n-butyllithium), displaces chloride and gives the desired silylamine product. Double deprotonation and reaction with a transition metal source gives the target indenoindolyl metal complex having open architecture. A typical reaction sequence follows:

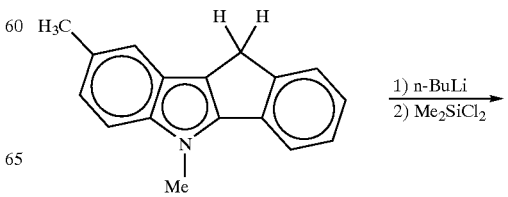

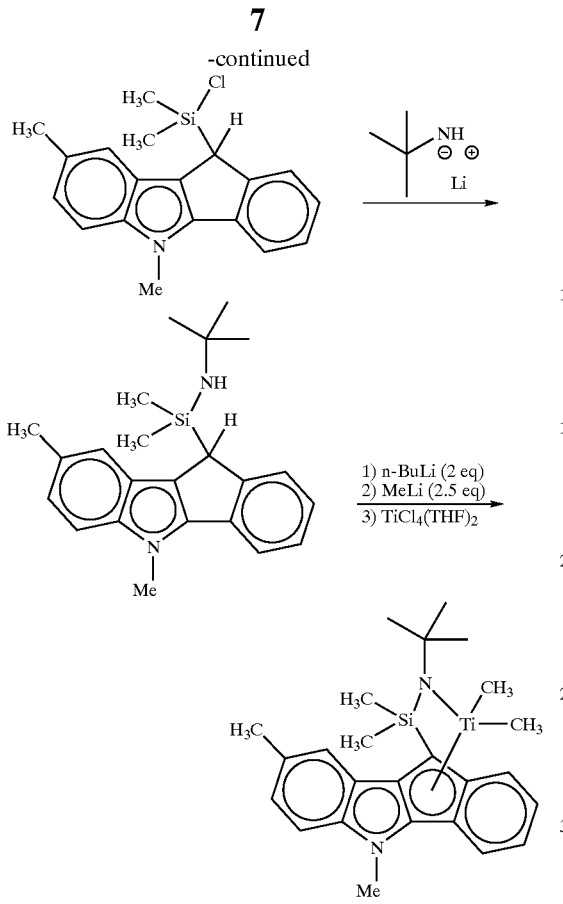

A similar complex can be generated by amine elimination, which may or may not require heating, with a method explored by Professor Richard F. Jordan and coworkers at the University of Iowa:

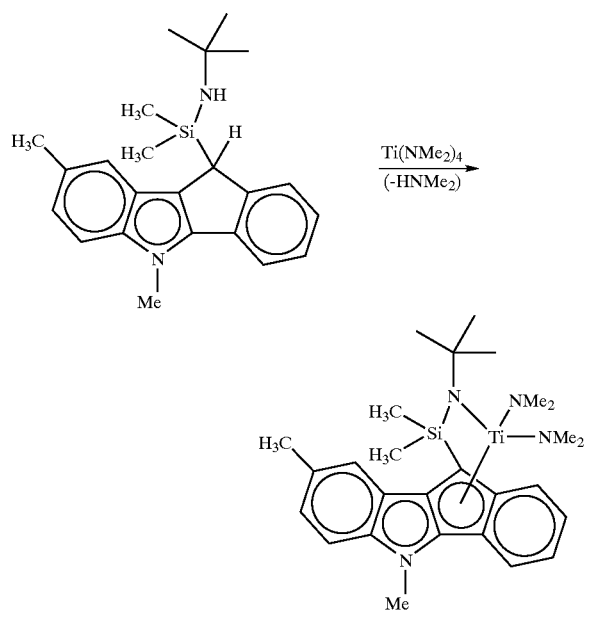

For additional examples of this approach to making organometallic complexes, see U.S. Pat. Nos. 5,495,035 and 6,440,889; *J. Am. Chem. Soc.* 118 (1996) 8024; and *Organometallics* 15 (1996) 4045.

The process of the invention can also utilize complexes in which bridging to the indenoindolyl group occurs through the indolyl nitrogen atom. A convenient route to an N-Si-N bridged complex is shown below:

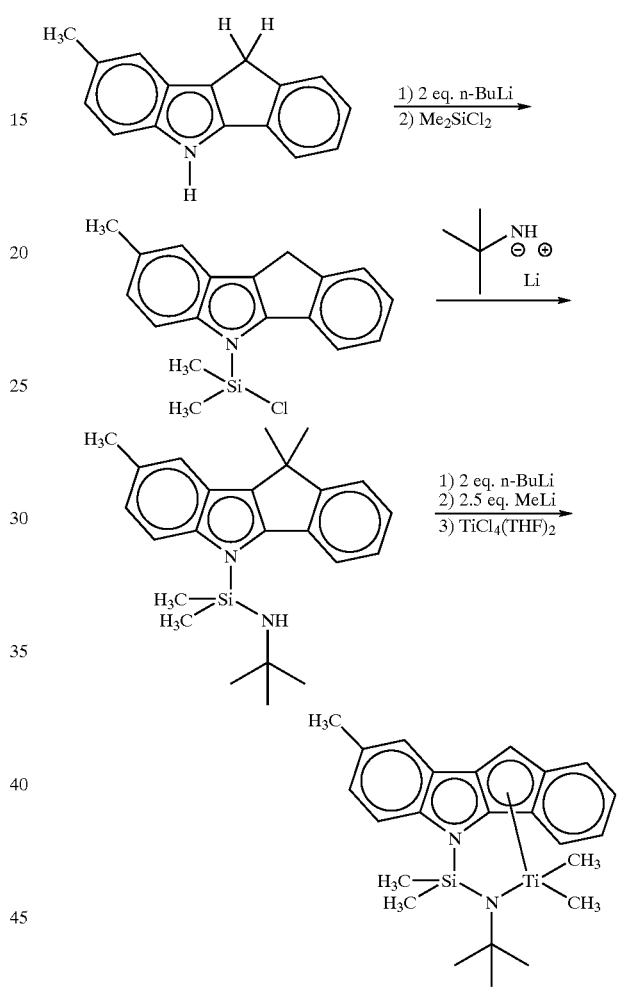

Or with amine elimination to form a similar complex:

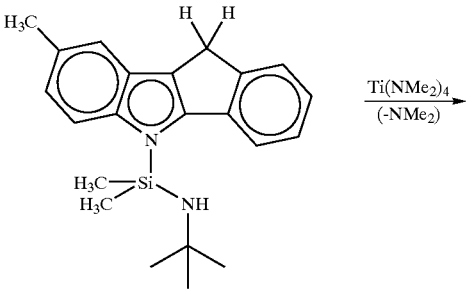

-continued

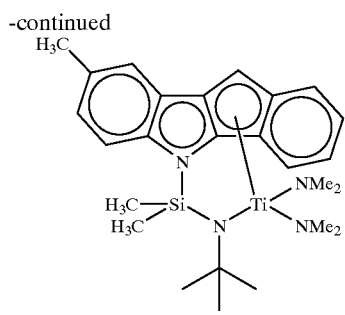

Similar strategies can be used to make a wide variety of indenoindolyl metal complexes having open architecture.

Any convenient source of the transition metal can be used to make the complex. As shown above, the transition metal source conveniently has labile ligands such as halide or dialkylamino groups that can be easily replaced by the indenoindolyl and amido anions of the bridged indenoindolyl ligand. Examples are halides (e.g., TiCl$_4$, ZrCl$_4$), alkoxides, amides, and the like.

Catalyst systems useful in the process include, in addition to the indenoindolyl metal complex, an activator. The activator helps to ionize the organometallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl) borate, lithium tetrakis(pentafluorophenyl)aluminate, anilinium tetrakis(pentafluoro-phenyl)borate, trityl tetrakis (pentafluorophenyl)borate and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference. Alumoxane activators, such as MAO, are preferred.

The optimum amount of activator needed relative to the amount of organometallic complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of transition metal, M. When the activator is an organoborane or an ionic borate or aluminate, the amount used will be within the range of about 0.01 to about 5000 moles, preferably from about 0.1 to about 10 moles, of activator per mole of M. The activator can be combined with the complex and added to the reactor as a mixture, or the components can be added to the reactor separately.

Optionally, the complex may be supported. The support material is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene. Most preferably, the support is silica.

Preferably the silica has a surface area in the range of about 10 to about 1000 m$^2$/g, more preferably from about 50 to about 800 M$^2$/g and most preferably from about 200 to about 700 m$^2$/g. Preferably the pore volume of the silica is in the range of about 0.05 to about 4.0 mL/g, more preferably from about 0.08 to about 3.5 mL/g, and most preferably from about 0.5 to about 3.0 mL/g. Preferably, the average particle size of the silica is in the range of about 1 to about 500 μm, more preferably from about 2 to about 200 μm, and most preferably from about 5 to about 100 μm. The average pore diameter is typically in the range of about 5 to about 1000 angstroms, preferably about 10 to about 500 angstroms, and most preferably about 20 to about 350 angstroms. Preferably the silica is dried before use. Preferably the drying is done at a temperature of from about 100° C. to about 800° C., more preferably from about 150° C. to about 600° C.

A variety of different chemical treatments of the support can be used, including reaction with organo-aluminum, -magnesium, -silicon, or-boron compounds. See, for example, the techniques described in U.S. Pat. No. 6,211,311, the teachings of which are incorporated herein by reference.

The amount of organometallic complex added per g support material is preferably from 0.01 mmol per gram to 0.8 mmol per gram.

The activator can be added directly to the polymerization reactor before or after adding a supported organometallic complex. In other words, a supported complex—without the activator—can be prepared first. In one preferred process, a solution of the organometallic complex is combined with the support. The mixture is stirred in an inert atmosphere at a temperature of from about 0° C. to about 120° C., more preferably from about 20° C. to about 40° C. The optimum stirring time will vary somewhat, depending upon the amounts of aromatic solvent and support material, but should be long enough to ensure good mixing. Preferably, the stirring time is from about 2 minutes to about 60 minutes. Stirring longer than 60 minutes should not decrease activity, but it is unnecessary. Stirring 30 minutes at room temperature is convenient and gives good results. If a large amount of solvent is used, the mixture is a slurry and it is convenient to remove some of the solvent to prepare a free flowing solid. This can be done at room temperature by applying a vacuum. In one preferred embodiment, an incipient wetness technique is used. A small amount of solvent is used to dissolve the complex and the solution is added to the support. The mixture remains a free flowing solid without solvent removal. The mixture can be used as is or residual solvent may be removed.

In another preferred embodiment, a solution of the activator is added to the support prior to the addition of the organometallic complex. This solution can contain all of the activator to be used, but preferably, it contains a portion of the activator to be used. Any remaining activator can be premixed with the complex or can be added to the reactor at the start of the polymerization.

Even more preferably, the organometallic complex is premixed with a solution of some or all of the activator prior to addition to the support. Preferably, the organometallic complex and activator solution are premixed for a period of time between 1 minute and two hours. When the organometallic complex is premixed with a solution of the activator, it is preferable to use a portion of the activator and to add the remainder of the activator either to the support prior to the addition of the premix or directly to the reactor.

Preferably, a scavenging amount of an alkyl aluminum compound such as triethyl aluminum or triisobutyl aluminum is also added to the reactor. Preferably, the alkyl aluminum compound is added to the reactor prior to the addition of the supported complex.

Hydrosilanes are organic compounds having at least one Si—H group. Optionally, the hydrosilane is a polysiloxyhydrosilane. Polysiloxyhydrosilanes have one or more Si—O—Si groups and at least one Si—H group. Preferably the hydrosilane has the general structure:

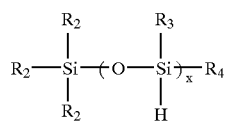

wherein each $R_2$ is independently selected from the group consisting of hydrogen, $C_1$–$C_{30}$ hydrocarbyl and trifluoroalkyl; $R_3$ is $C_1$–$C_{10}$ hydrocarbyl; x is an integer from 0 to 200 and $R_4$ is selected from the group consisting of hydrogen, trialkylsiloxy and $C_1$–$C_{10}$ hydrocarbyl with the proviso that when x is 0, $R_4$ is hydrogen. Preferably, x is 0 or has a value of from 10 to 100.

Suitable hydrosilanes include alkyltrihydrosilanes, aryltrihydro-silanes, dialkyldihydrosilanes, diaryldihydrosilanes, trialkylhydrosilanes, triarylhydrosilanes, alkylhydrosiloxanes and arylhydrosiloxanes. Preferred hydrosilanes include polymethylhydrosiloxanes, t-butyldimethylhydrosilane, triethylhydrosilane, diethyldihydrosilane and triisopropylhydrosilane and the like and mixtures thereof.

The optimum amount of hydrosilane needed relative to the amount of organometallic complex depends on many factors, including the desired molecular weight, the kind of polyolefin product, the reaction conditions, and other factors. Generally, however, the amount used will be within the range of about 10 to about 5000 grams, preferably from about 20 to about 1000 grams, and more preferably from about 50 to about 500 grams of silicon per gram of transition metal.

The hydrosilane can be combined with the complex and added to the reactor as a mixture, or the components can be added to the reactor separately.

We surprisingly found that using a hydrosilane in combination with an open architecture indenoindolyl complex provides polyolefins with increased molecular weight compared with polyolefins prepared with the same catalysts but without the hydrosilane (see Table 1).

The olefin is polymerized in the presence of a hydrosilane and the catalyst system. Suitable olefins include ethylene, propylene, 1-butene, 1-pentene, 1-hexene, 1-octene, and mixtures thereof. Preferably, the olefin is ethylene or ethylene with a second olefin such as 1-butene or 1-hexene.

Hydrogen is optionally used in the polymerization to regulate the molecular weight. The amount of hydrogen needed depends upon the desired polyolefin molecular weight and flow. Generally, as the amount of hydrogen is increased, the polyolefin molecular weight decreases and the flow increases. Since the hydrosilane enables the production of high molecular weight polyolefins, hydrogen may be used to fine-tune the molecular weight and flow of the polyolefin.

While there are many ways to practice the olefin polymerization process of the invention, the process is preferably a slurry or gas-phase process. These processes are well-suited to the use of supported catalysts. Suitable methods for polymerizing olefins using the catalysts of the invention are described, for example, in U.S. Pat. Nos. 5,902,866, 5,637, 659, and 5,539,124, the teachings of which are incorporated herein by reference.

The polymerizations can be performed over a wide temperature range, such as about −30° C. to about 280° C. A more preferred range is from about 10° C. to about 180° C.; most preferred is the range from about 30° C. to about 100° C. Olefin partial pressures normally range from about 0.1 MPa to about 350 MPa. More preferred is the range from about 0.1 MPa to about 7 MPa.

Catalyst concentrations used for the olefin polymerization depend on many factors. Preferably, however, the concentration ranges from about 0.01 micromoles transition metal per liter to about 100 micromoles per liter. Polymerization times depend on the type of process, the catalyst concentration, and other factors. Generally, polymerizations are complete within several seconds to several hours.

The process gives polyolefins with increased molecular weight. Generally, with increased molecular weight, strength and toughness increase and flow decreases.

The following examples merely illustrate the invention. Those skilled in the art will recognize many variations that are within the spirit of the invention and scope of the claims.

Preparation of Open Architecture Complex 4

(a) Preparation of Indeno[1,2-b]indole 1. A mixture of 1-indanone (30.6 g, 232 mmol) and p-tolylhydrazine hydrochloride (37.0 g, 233 mmol) in ethanol (350 mL) and aqueous HCl (12 N, 18 mL) are heated to reflux for 90 minutes. The mixture is cooled and filtered, and the solid is washed with ethanol (600 mL) followed by 20% aqueous ethanol (400 mL) and finally hexanes (200 mL). The off-white solid is dried under vacuum (36.5 g, 72%).

(b) N-Methylation of 1. A mixture of 1 (36.5 g, 166 mmol), aqueous NaOH solution (112 mL, 20 M, 2.2 mol), $C_{16}H_{33}NMe_3Br$ (0.65 g, 1.78 mmol), and toluene (112 mL) is vigorously stirred at room temperature. A solution of methyl iodide (17.0 mL, 273 mmol) in toluene (15 mL) is added dropwise, and the mixture is stirred at room temperature for 4 hours and refluxed for 3 hours. A crystalline solid forms upon cooling and is filtered and washed with cold (−78° C.) ethanol (300 mL) followed by hexanes (100 mL). The layers are separated and the aqueous fraction is washed with toluene (2×100 mL). The organics are combined and dried over $Na_2SO_4$ and filtered. The volatiles are removed under vacuum and the precipitate is dried and combined with the crystalline product 2 (total yield 25.7 g, 66%).

(c) Bridged ligand preparation (3). n-Butyllithium (8 mL, 2.5 M in hexane, 20 mmol) is added dropwise to a solution of 2 (4.66 g, 21 mmol) in dry ether (70 mL). After 2 h, this solution is slowly added to a solution of dichlorodimethylsilane (5.20 g) in ether (30 mL). After. 2 hours of stirring at room temperature, the mixture is filtered and evaporated. The residue is redissolved in ether (60 mL), and an ethereal solution of lithium t-butylamide (prepared in the usual manner from t-butylamine (1.46 g) and n-butyllithium (8 mL of 2.5 M solution)) is added dropwise. The mixture is stirred for 3 hours, and is then filtered through Celite filter aid. After concentrating the filtrate, the residue is collected with pentane and chilled to −30° C. Yield of bridged ligand 3: 6 g (82%).

(d) Preparation of open architecture complex 4. Bridged ligand 3 (6 g) is dissolved in ether (120 mL) and n-butyllithium (13.5 mL of 2.5 M solution in hexane) is added. After stirring overnight at room temperature, methyllithium (24.5 mL of 1.4 M solution in ether) is added, and the mixture is cooled to −30° C. Titanium tetrachloride bis(tetrahydrofuran) complex (5.66 g) is added, and stirring continues for 3 hours. The mixture is filtered and the filtrate is concentrated. The residue is extracted with hot heptane (2×100 mL). The combined filtrates are evaporated, and the residue is crystallized with pentane and cooled to −30° C. The product, complex 4, is a dark brown solid. Yield: 4.67 g.

The $^1$H NMR spectrum is consistent with the proposed structure:

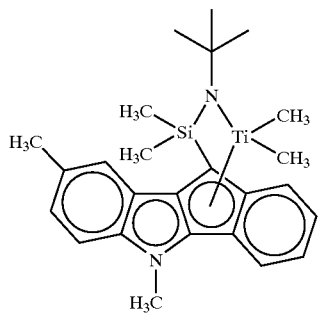

4

EXAMPLE 1

Copolymerization of Ethylene and 1-Hexene

A 20-mL steel vessel equipped with a 15-mL glass liner is charged with 4.5 mL toluene, complex (0.1 mL of 0.5 mM solution of complex 4 in heptane), hydrosilane (0.1 mL of 0.25 M t-butyldimethylsilane in heptane), and 0.1 mL of 1.95 M modified methylalumoxane 3A in heptane, available from Akzo Nobel. The vessel is heated to 80° C. and 1-hexene (0.5 mL of 8 M solution in heptane) is added. Hydrogen is added to pressurize the vessel to 0.3 MPa and ethylene fed to the vessel to maintain 2.1 MPa. The polymerization proceeds for ten minutes. The reactor is vented, and methanol is added. The solvent is evaporated and the polyolefin is collected and dried prior to testing. Catalyst activity is 943 kg polyolefin per g titanium per hour. The number average ($M_n$) molecular weight and polydispersity ($M_w/M_n$) of the polymer are measured by gel permeation chromatography (GPC) using 1,3,5-trichlorobenzene at 145° C. to be $M_n$=37,200 and $M_w/M_n$=3.0.

EXAMPLE 2

The polymerization procedure of Example 1 is generally followed except that triethylsilane (0.1 mL of 0.25 M in heptane) is used in place of t-butyldimethylsilane.

EXAMPLE 3

The polymerization procedure of Example 1 is generally followed except that poly(methylhydrosiloxane) solution (0.1 mL of a solution prepared by diluting 0.5 mL of poly(methylhydrosiloxane) (density: 1.006 g/mL) to 25 mL with heptane) is used in place of t-butyldimethylsilane.

EXAMPLE 4

The polymerization procedure of Example 3 is repeated to verify reproducibility.

COMPARATIVE EXAMPLE 5

The polymerization procedure of Example 1 is generally followed except that no hydrosilane is used.

Results of polymer testing appear in Table 1.

TABLE 1

| | Polymerization Results | | | |
|---|---|---|---|---|
| Example | Hydrosilane | Mn | Mw/Mn | Activity |
| 1 | t-Butyldimethylsilane | 37,200 | 3.0 | 943 |
| 2 | Triethylsilane | 30,400 | 3.4 | 1549 |
| 3 | Poly(methylhydrosiloxane) | 32,100 | 3.4 | 1052 |
| 4 | Poly(methylhydrosiloxane) | 33,500 | 3.1 | 996 |
| C5 | None | 24,000 | 3.3 | 1501 |

Example 3 and repeat Example 4 show that there is good reproducibility with the polymerizations. Examples 1–4 with added hydrosilane provide polymers with remarkably higher molecular weight than Comparative Example 5, demonstrating the advantage of hydrosilane addition to achieve higher molecular weight with open architecture indenoindolyl single-site catalysts.

The preceding examples are meant only as illustrations. The following claims define the invention.

We claim:

1. A process which comprises polymerizing an olefin in the presence of a hydrosilane and a catalyst system which comprises an activator and a bridged indenoindolyl Group 4–6 transition metal complex having open archit architure, wherein the hydrosilane is used in an amount effective to increase polyolefin molecular weight.

2. The process of claim 1 wherein the transition metal complex has the general structure selected from the group consisting of:

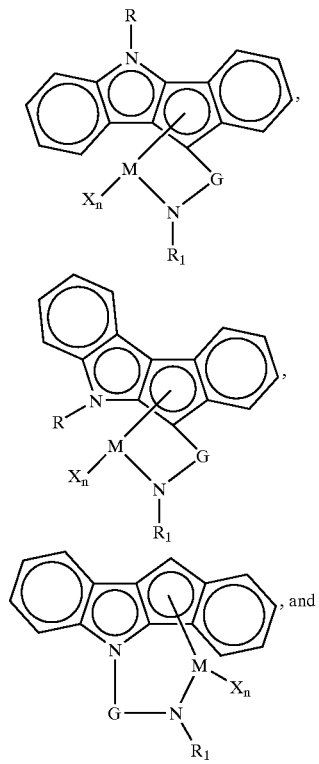

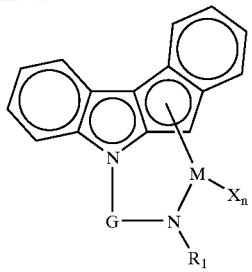

in which M is a Group 4–6 transition metal, G is a linking group, R is alkyl, aryl, dialkylboryl, or trialkylsilyl, $R_1$ is $C_1$–$C_{20}$ hydrocarbyl, X is alkyl, aryl, alkoxy, aryloxy, halide, dlalkylamino, or slioxy, and n satisfies the valence of M.

3. The process of claim 1 wherein the olelin is selected from the group consisting of ethylene, propylene, 1-butene, 1-pentene, 1-hexene, 1-octene and mixtures thereof.

4. The process of claim 1 wherein the activator is selected from the group consisting of alumoxanes, ionic borates, ionic aluminates, alkylaluminums, and aluminoboronates.

5. The process of claim 2 wherein M is a Group 4 transition metal.

6. The process of claim 2 wherein M is Ti or Zr, G is dimethylsilyl, and X is halide or alkyl.

7. The process of claim 1 wherein the polymerization is performed at a temperature within the range of about 30° C. to about 100° C.

8. A slurry polymerization process of claim 1.

9. A gas-phase polymerization process of claim 1.

10. The process of claim 1 wherein the hydrosilane has the general structure:

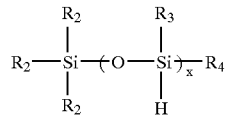

wherein each $R_2$ is independently selected from the group consisting of hydrogen, $C_1$–$C_{10}$ hydrocarbyl, and trifluoroalkyl; $R_3$ is $C_1$–$C_{10}$ hydrocarbyl; x is an integer from 0 to 200 and $R_4$ a selected from the group consisting of hydrogen, trialkylsiloxy and $C_1$–$C_{10}$ hydrocarbyl with the proviso that when x is 0, $R_4$ is hydrogen.

11. The process of claim 10 wherein $R_2$ is $C_1$–$C_{10}$ hydrocarbyl, x is 0 and $R_4$ is hydrogen.

12. The process of claim 10 wherein x is an integer from 5 to 100, $R_2$ is $C_1$–$C_{10}$ hydrocarkyl, and $R_4$ is trialkylsiloxy.

13. The process of claim 12 wherein $R_2$ and $R_3$ are methyl and $R_4$ is trimethylsiloxy.

14. The process of claim 10 wherein the hydrosilane is used at a level of from about 20 to about 1000 grams of silicon per gram of transition metal.

15. The process of clam 14 wherein the hydrosilane is used at a level of from about 50 to about 500 grams of silicon per gram of transition metal.

* * * * *